United States Patent
Ramachandran et al.

(10) Patent No.: US 7,689,575 B2
(45) Date of Patent: Mar. 30, 2010

(54) BITMASK ACCESS FOR MANAGING BLOG CONTENT

(75) Inventors: Vijay Sundar Ramachandran, Bangalore (IN); Hitesh Shashikant Shah, Mumbai (IN)

(73) Assignee: Yahoo! Inc., Sunnyvale, CA (US)

(*) Notice: Subject to any disclaimer, the term of this patent is extended or adjusted under 35 U.S.C. 154(b) by 400 days.

(21) Appl. No.: 11/027,208

(22) Filed: Dec. 29, 2004

(65) Prior Publication Data
US 2006/0143208 A1    Jun. 29, 2006

(51) Int. Cl.
G06F 7/00 (2006.01)
G06F 17/00 (2006.01)

(52) U.S. Cl. .................... 707/101; 707/104.1
(58) Field of Classification Search ........... 707/1–10, 707/100–104.1, 200–206; 370/218, 352–356, 370/395.52, 473, 394; 709/217, 219
See application file for complete search history.

(56) References Cited

U.S. PATENT DOCUMENTS

| | | | | |
|---|---|---|---|---|
| 5,485,455 A | * | 1/1996 | Dobbins et al. | 370/255 |
| 5,491,694 A | * | 2/1996 | Oliver et al. | 370/455 |
| 6,151,602 A | * | 11/2000 | Hejlsberg et al. | 707/10 |
| 6,456,234 B1 | * | 9/2002 | Johnson | 342/357.09 |
| 6,651,052 B1 | * | 11/2003 | Westphal | 707/3 |

OTHER PUBLICATIONS

Velasquez et al., Combining the Web content and usage mining to understand the visitor behavior in a Web site, Nov. 19-22, 2003, IEEE, 669-672.*
Yuanyuan Gao et al., A cognitive map-based decision support model for Web resource management, May 2-5, 2004, IEEE, vol. 1, 141-144.*

* cited by examiner

*Primary Examiner*—Jean B Fleurantin
(74) *Attorney, Agent, or Firm*—Darby & Darby P.C.; Jamie L. Wiegand

(57) ABSTRACT

Methods, devices, and systems are directed towards managing a database using moderator determined attributes, and a contributor employable bitmask. In one embodiment, the database is employable for use in managing a weblog (blog). The bitmask is configured to enable contributors of a content item to modify selected options of an attribute for the provided content item. In one embodiment the bitmask is stored in the database and is associated with the content item in the database. By enabling a contributor to directly control options associated with an attribute for the content item, changes to selected attributes of the database's content may be made with minimum interaction with a database administrator. For example, in one embodiment, the contributor may directly control anonymity associated with the provided content item, access to the provided content item, and how the provided content items is displayed.

29 Claims, 5 Drawing Sheets

BITMASK ACCESS FOR MANAGING BLOG CONTENT

FIELD

The invention is generally directed towards databases, and in particular, but not exclusively, towards enabling a content contributor to use a bitmask to directly control an attribute of content provided to a blog database.

BACKGROUND

The amount of stored and generally accessible data has grown at an astounding rate, particularly with the advent and subsequent popularity of the Internet. Much of the data is maintained on databases. Databases can be used to store data such as, for example, webpages, messages on message boards, and compilations of documents or images. When the data is needed, the database is queried and the data found and displayed. As the amount of data in the database grows, the time to search for data on the database increases. In addition, a database user may wish to identify characteristics or attributes of the data including how the data is presented or how it is to be used.

As one example of a relatively new database application, weblogs or, more commonly, blogs, have become an increasingly popular forum for communication and discussion. Blogs are typically a publicly accessible personal journal written by an individual who is often referred to as a "blogger". Blogs can be updated daily or more or less frequently and on a more or less regular basis. The entries to the blog are generally displayed in reverse chronological order so that the latest data is at the top of the page. Each blog entry also typically includes a date stamp. The content of blogs varies widely with some blogs dedicated to particular subjects or to particular interests of the blogger and other blogs sharing the random thoughts and activities of their creators.

In addition to the journal, blogs often allow readers to post messages related to the blog entry. This allows discussion and exchange between and among the blogger and his readers. Service providers can create an environment in which bloggers can set up and operate their individual blogs. A database supporting one or more blogs can become very large, particularly if the blog(s) are active with journal articles and messages from readers. Individual bloggers or readers may wish to identify characteristics or attributes of the data including how the data is presented or how it is to be used.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure may be thorough and complete, and may fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the invention is directed to enabling a contributor of content to a blog database to directly manage that content though a bitmask. In particular, the invention enables a moderator to determine an attribute for the content. A contributor of the content can then use the bitmask to directly control a selectable option (using one or more bits) associated with the determined attribute of the content. In one embodiment, the contributor may employ an Application Programming Interface (API), a template, a file, and the like, to modify one of more bits within the bitmask.

The bitmask may be stored in the database and be associated with the provided content. The content may be presented to the database in one or more packets. The bitmask may be associated with each of the packets for storage in the database. By enabling a contributor to directly control options within an attribute for the blog's database content, selected changes to attributes of the database content may be made with minimum interaction with a database administrator. For example, in one embodiment, the contributor may directly control anonymity associated with contributed content, access to the contributed content, how the contributed content is displayed, and so forth. Such direct control further enables the content contributor to have increased confidence that the provided content may maintain its integrity, and be viewed, used, accessed, and the like, as the content contributor so determines.

Illustrative Operating Environment

Figure 1:
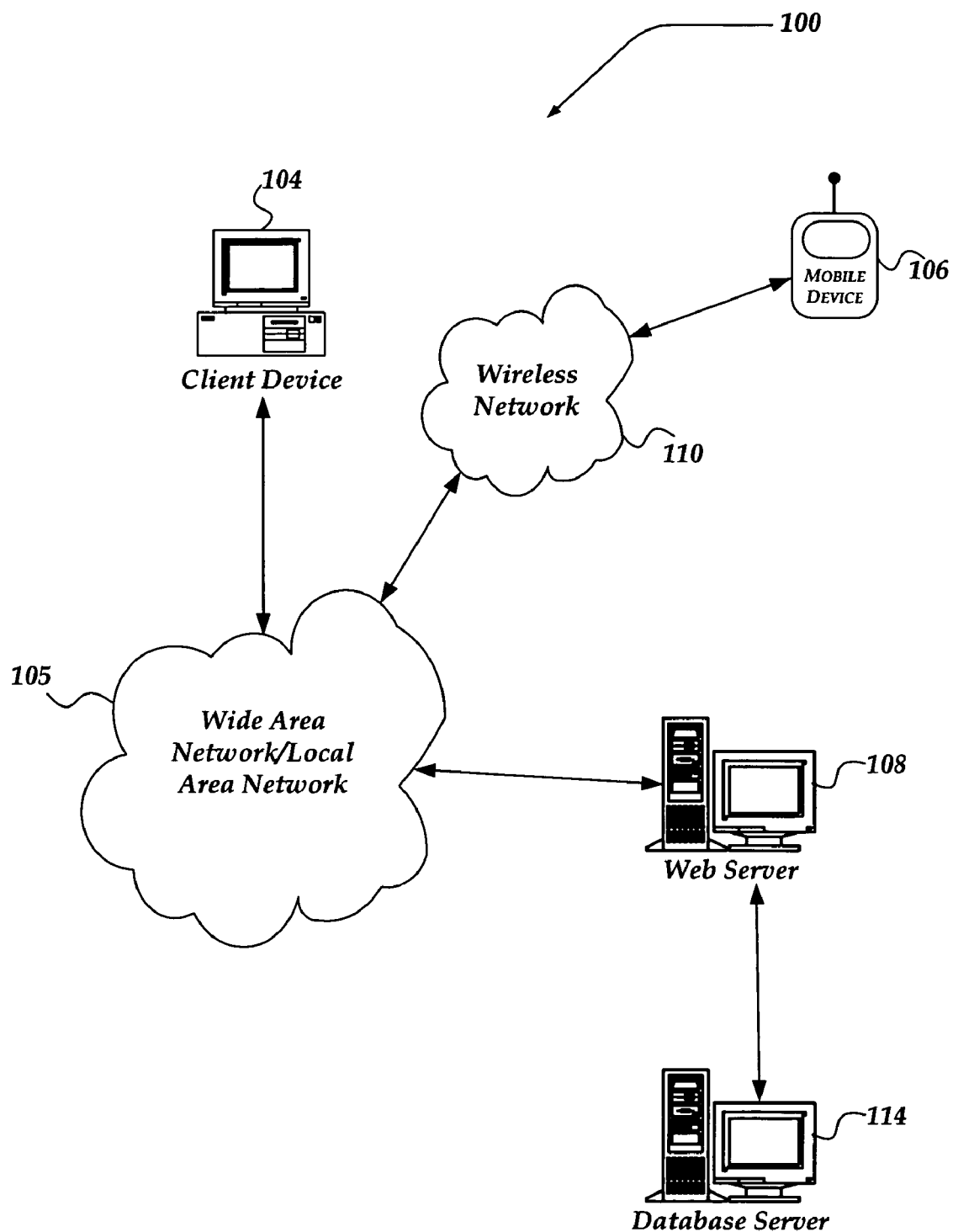
FIG. 1 schematically illustrates one embodiment of an operating environment in which the present invention may operate.

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes client device 104, mobile device 106, local area networks ("LANs")/wide area networks ("WANs") 105, wireless network 110, web server 108, and database server 114. In some embodiments, web server 108 and database server 114 are the same. In some embodiments, client device 104 is wired directly to web server 108.

Client device 104 and mobile device 106 can be used to retrieve or add content to the database on the database server 114 via the web server 108. Generally, mobile device 106 can include virtually any computing device capable of connecting to another computing device and receiving content, and other data. Such devices include portable devices such as, for example, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Mobile device 106 may also include other computing devices, such as personal computers, multiprocessor systems, microprocessor-based or programmable consumer electronics, network PCs, and the like. As such, mobile device 106 typically ranges widely in terms of capabilities and features. For example, a cell phone can have a numeric keypad and a few lines of monochrome LCD display on which only text may be displayed. In another example, a web-enabled mobile device has a touch sensitive screen, a stylus, and several lines of color LCD display in which both text and graphics may be displayed. Moreover, the web-enabled mobile device can include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, and the like, to display and send a message.

Mobile device 106 can include at least one client application that is configured to receive content from another computing device, such as web server 108. The client application may include a capability to provide and receive one or more of textual content, graphical content, audio content, and the like, including, but not limited to, content in the form of files, e-mail, or messages. The client application may further provide data that identifies itself, including a type, capability, name, identifier, and the like. The data may also indicate a content format that mobile device 106 is enabled to employ. Mobile device 106 may also be configured to communicate a message, such as through a Short Message Service (SMS), Multimedia Message Service (MMS), instant messaging (IM), internet relay chat (IRC), mIRC, Jabber, and the like, between another computing device, such as web server 108, and the like.

Client device 104 represents another embodiment of a device, such as a personal computer, multiprocessor system, microprocessor-based or programmable consumer electronics, network PC, and the like, that can connect to web server 108. Client device 104 may operate substantially similar to mobile device 106 in many ways, and different in other ways. For example, client device 104 can represent more traditional wired devices. As such, client device 104 can be configured to communicate with web server 108, and other network devices, employing substantially similar mechanisms as mobile device 106 for wired device implementations.

Client device 104 and mobile device 106 can include a browser application that is configured to receive and to send web pages, web-based messages, and the like. The browser application may be configured to receive and display graphics, text, multimedia, and the like, employing virtually any web based language, including Standard Generalized Markup Language (SGML), such as HyperText Markup Language (HTML), and so forth. Client device 104 may further include a client application that enables it to perform a variety of other actions, including, communicating a message, such as through a Short Message Service (SMS), Multimedia Message Service (MMS), instant messaging (IM), internet relay chat (IRC), mIRC, Jabber, and the like, between itself and another computing device.

Client device 104 and mobile device 106 may further include another application that enables access to content associated with a database, including a blog database. The other application may enable client device 104 and mobile device 106 to provide a content item to the blog database, as well as to access, modify, view a content item, and the like.

Client device 104 and mobile device 106 may be further configured to access a bitmask associated with a provided content item. Bitmasks are described in more detail below, in conjunction with FIG. 3. Briefly, however, bitmasks include a collection of one or more bits that enable a content provider to directly control attributes associated with the provided content, including how the content is viewed, accessed, modified, a source associated with the provided content, and the like.

Client device 104 and mobile device 106 may employ any of a variety of mechanisms to access and modify the bitmask, including an API, a template, a file, a window interface, a command line interface, and so forth. In one embodiment, client device 104 and mobile device 106 employs the mechanism to modify one or more bits within the bitmask for the provided content. For example, a contributor of the content may use the mechanism, such as the API, to set or more bits within the bitmask that are associated with an attribute of the content item.

Client device 104 and mobile device 106 may then provide the bitmask to the blog database to be associated with the provided content, and for storage in the blog database. Client device 104 and mobile device 106 may further employ a process substantially similar to that described below in conjunction with FIG. 5.

Wireless network 110 is configured to couple mobile device 106 and its components with WAN/LAN 105. Wireless network 110 may include any of a variety of wireless sub-networks that may further overlay stand-alone ad-hoc networks, and the like, to provide an infrastructure-oriented connection for mobile device 106. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 106 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which data may travel between mobile device 106 and another computing device, network, and the like.

Network 105 is configured to couple web server 108 and its components with other computing devices, including client device 104, and through wireless network 110 to mobile device 106. Network 105 is enabled to employ any form of computer readable media for communicating data from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs can include, for example, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link. In essence, network 105 includes any communication method by which data may travel between web server 108 and another computing device. Furthermore, the number of WANs, and LANs in FIG. 1 may be increased or decreased arbitrarily.

The media used to transmit data in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any data delivery media. The terms "modulated data signal," and "carrier-wave signal" includes a signal that has one or more of its characteristics set or changed in such a manner as to encode data, instructions, data, and the like, in the signal. By way of example, communication media includes wired media such as twisted pair, coaxial cable, fiber optics, wave guides, and other wired media and wireless media such as acoustic, RF, infrared, and other wireless media.

Web server 108 and database server 114 can be connected together in any manner including, but not limited to, the Internet; local area networks (LANs); wide area networks (WANs); direct connections, such as through a universal serial bus (USB) port or through other forms of computer-readable media; mesh networks; Wireless LAN (WLAN) networks; cellular networks; or any combination thereof.

One embodiment of server, that can be a web server 108, database server 114, or a combination thereof, is described in more detail below in conjunction with FIG. 2. Briefly, however, web server 108 typically includes any computing device capable of connecting to network 105 to receive database content and other data, or requests for database content and other data from a client device 104 or mobile device 106. Database server 114 typically includes any computing device that can store database content and other data; transmit database content and other data to the web server; and search for content and other data on the database server based on a request from the server. Alternatively, searching of the database server can be performed using another device, such as the web server, that accesses the content and other data stored on the database server. In one embodiment, the other data may include, for example, a bitmask associated with content. In one embodiment, database server 114 and/or web server 108 are employed to manage a blog website.

Devices that may operate as web server 108 or database server 114 include personal computers desktop computers, multiprocessor systems, microprocessor-based or programmable consumer electronics, network PCs, servers, and the like.

Illustrative Server Environment

Figure 2:
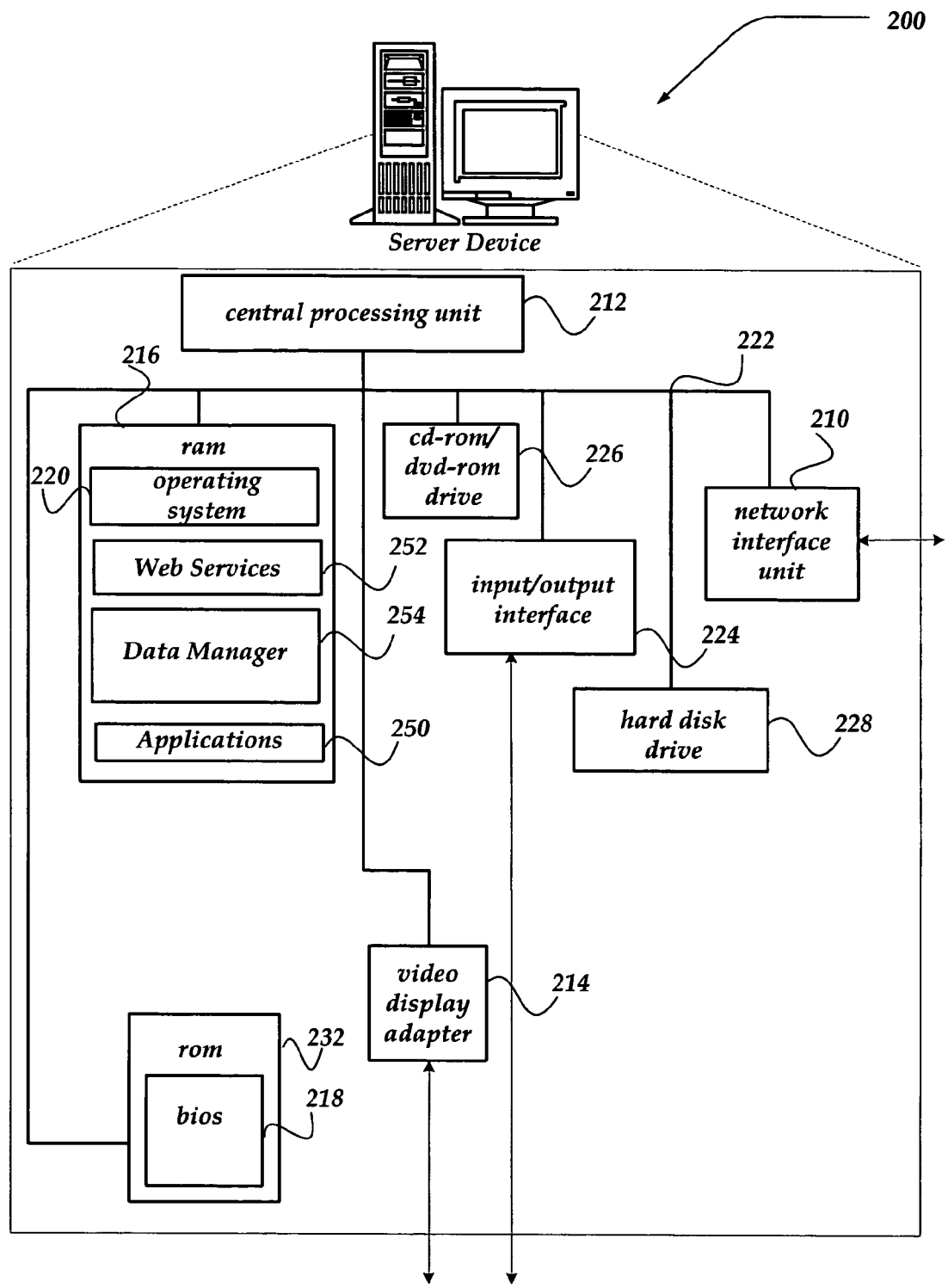
FIG. 2 schematically illustrates one embodiment of a server, usable in FIG. 1.

FIG. 2 shows one example of a server device, according to one embodiment of the invention. Server device 200 may include many more or less components than those shown. The components shown, however, are sufficient to disclose an illustrative embodiment for practicing the invention. Server device 200 may, for example, be employed to operate as web server 108 and/or database server 114 of FIG. 1. Components may be the same or different for each type of server or for servers of the same type.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as network 105 and wireless network 110 in FIG. 1, via network interface unit 210, which is constructed for use with various communication protocols including TCP/IP protocol, UDP/IP protocol, and the like. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 can also include input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server device 200 to store, among other things, application programs, and the like.

The mass memory as described: above illustrates another type of computer-readable media, namely computer storage media. Computer storage media may include volatile, non-volatile, removable, and non-removable media implemented in any method or technology for storage of data, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired data and which can be accessed by a computing device.

The mass memory also stores program code and data. One or more applications 250 are loaded into mass memory and run on operating system 220. Examples of application programs include email programs, schedulers, calendars, security services, transcoders, database programs, word processing programs, spreadsheet programs, and so forth. Mass storage may further include applications such as web services 252 and data manager 254.

Web services 252 are configured to manage requests from a client or mobile device's browser application and deliver web-based content in response. As such, web services 252 may include such applications as Apache, Internet Data Server (IIS), Netscape, National Center for Supercomputing Applications (NCSA), and the like. In one embodiment, web services 252 communicate with the client's browser application employing HTTP. However, web services may also execute server-side scripts (CGI scripts, JSPs, ASPs, and so forth) that provide functions such as database searching, e-commerce, and the like.

In one embodiment, web services 252 may interact with data manager 254 to receive content or a request for content from client device 104 or mobile device 106 and direct the content or request for content to the database server 114.

Data manager 254 may further provide client device 104 and mobile device 106 with access to a bitmask for use in directly controlling an attribute of provided content. Data manager 254 may provide any of a variety of mechanisms to access and modify the bitmask, including an API, template, file, menu, a window, and so forth. In one embodiment, the template, file, and the like, may be downloadable for use on client device 104 and/or mobile device 106.

Databases can be used to store and access a variety of content. Some uses of databases include the dynamic storage and access of content contributed on an ongoing basis by a number of individuals. Such databases may be web-based. Examples of such databases include message boards, blogs, classified advertisement sites, personal advertisement sites, document management sites, and the like. The invention is not constrained, however, to these examples, and this invention may include virtually any database.

There are a number of individuals or entities that may take a role in operation of a database. Typically, there is a service provider that provides the database server or servers upon which the database is stored and, optionally, the database software. The service provider may also provide a web server or servers to access the database server. The service provider often provides services for many databases simultaneously. The service provider may have rules regarding the maintenance and use of the database and may also restrict the format, type, or source of content contributed to the database.

The database may also have a database administrator. The database administrator can be the same as the service provider or can be a person or company hired by the service provider. The database administrator maintains the database on the database server and oversees the software and, optionally, the hardware for the database to ensure that they are operating properly. The database administrator may have rules regarding the use of the database and the format, type, and source of content contributed to the database.

The database may further have a moderator that oversees and manages the content of the database, as well as the "look and feel" of the database. The moderator may be a different individual or entity from the service provider and/or the database administrator. The moderator may be active or relatively inactive in the oversight role. The moderator, or the moderator's predecessor, may select the topic or subject matter of the database. The moderator may have the authority to remove or modify some of the content within the database. For example, a moderator can have the authority to remove or modify content that is, for example, not relevant to the topic of the database, inappropriate, offensive, or illegal. Examples of moderators include board moderators for message boards, bloggers for blogs, and so forth. A database may have one or more moderators and, if there is more than one moderator, the moderators may have equal authority or there may be a hierarchical or other ordering among the moderators.

There are also contributors to the database and users of the database. Contributors provide content to the database, such as, for example, messages, blog entries, comments on blog entries, advertisements for personal or classified ad databases, documents, files, pictures, videos, images, clips, graphics, and the like. Users obtain content from the database; for example, users can read messages or other text from the database, download or view files or graphics from the database, and so forth. Contributors can also be users and moderators. For example, a board moderator of a message board can also be a contributor of messages. As another example, a blogger, who is also typically the moderator of a blog, can contribute blog entries, comments, or messages.

The database includes a number of defined or definable attributes. Some attributes are directed to the operation of the database. Examples of such database operations include the "look and feel" of the database, storage of database content, access of database content, display of database content, and searching of database content. Attributes of the database can include, for example, graphics associated with the database, rules for access to the database or access to content (or subsets of content) on the database, rules for the display of database content, rules for submission of database content, the type of information (e.g., date of submission, name of contributor, source, type) stored about the database content, information displayed with the database content, the type of searching allowed on the database, the searchable fields of the database, the allowed search commands, and so forth. Such examples are not intended to constrain the invention, and virtually any database operation may be represented by an attribute, without departing from the scope or spirit of the invention.

Other database attributes can be associated with individual items of database content. Such attributes or the selection of options for such attributes often can be variable between items of database content. For example, such attributes can include the source and/or anonymity of the item, the medium by which the item was provided to the database, access to the item, status of the item (e.g., whether the service provider, database administrator, and/or moderator may access the item and/or show the source of the item), and the like.

Such database attributes may be implemented, therefore, using any of a variety of mechanisms, including a field within a database record, a name/value pair, a characteristic of the field, and the like.

Conventionally, database attributes are selected or modified by the service provider or database administrator. The moderator can make suggestions for the attributes or request changes to the attributes to the service provider or database administrator and then, if the database administrator or service provider should choose to do so, the attributes can be selected or modified.

In contrast to conventional database operation, in one embodiment the moderator is permitted to determine one or more attributes of the database and the moderator is permitted to implement this determination of attributes without any other assistance or any approval by the service provider and/or database administrator. Determination of attributes includes, for example, selecting new attributes, modifying existing attributes, or removing existing attributes. The moderator-determined attributes can become, for example, local rules or local options that apply to that particular database.

As an example, in one embodiment, the moderator can decide and implement database attributes regarding rules of access to the database or to database content. For example, the moderator may grant access to the database to everyone or may restrict access to the database or to a portion of the contents of the database to a particular group of people. In one embodiment, the moderator restricts access to the database to a particular group of individuals. In another embodiment, the moderator restricts access to the database or a portion of the contents of the database to adults. The moderator may also determine rules regarding how a user demonstrates that he is within the group with access rights to the database or to database content.

As another example of determination of an attribute by the moderator, in one embodiment, the moderator can implement a change to the look of the database. For example, the moderator of a blog database (e.g., the blogger) may include a picture of the blogger or a graphic selected by the blogger when contents of the database are displayed. The moderator may also or alternatively allow contributors to the database to associate a graphic with content contributed by that particular contributor.

As yet another example of selection or modification of an attribute by the moderator, the moderator can implement a change to the information collected by the database or information displayed by the database or both. For example, the moderator may direct that information about the medium providing the content be collected (e.g., whether the content came by e-mail, a message service, a mobile phone, etc.). This information may be displayed, if desired, when the content is displayed.

While some attributes may be available to the moderator for selection or modification, the service provider or database administrator may reserve other attributes that can not be determined by the moderator. In addition, the service provider or database administrator or both may reserve the right to select or modify those attributes that are also determinable by the moderator. In some embodiments, the service provider or database administrator or both may also make their selection or modification of any attribute take precedence over any selection or modification of that attribute by the moderator. In this manner, the service provider or database administrator can still exercise control over the database if they choose to do so.

Some attributes can have two or more options that can be selected for individual items of database content while other attributes may have a single universal value that applies to the entire database or all database content. Some attributes may have two options corresponding to whether the attribute or rule is applied to the item of database content or not. As an example of attribute options, in some embodiments an access rule for database content could have any number of options. As one example, an access rule includes four options that can be individually selected for each item of database content. One option is universal access meaning that anyone can access a particular item of database content. Another option restricts access to the item of database content to a first group of people such as board subscribers. A third option may restrict access to the item of database content to a second group of people such as the moderator and his associates. A fourth option may restrict access to the item of database content to the moderator and the contributor. When there is a request to access or display this particular item of database content, the software accessing the database may determine whether the requester is allowed access to the content based on the access rule and the option selected for this item of database content.

In one embodiment, the moderator is allowed to determine and implement options regarding an attribute. Such determination of options can include, for example, one or more of the following: determining the number of options available, determining the description of each option, determining whether the selection of the option is automatic or manual, determining who can select which option applies to the item of database content or to the database itself, determining whether the option can be modified, and determining who can modify the initially selected option.

Some attributes can have options that are automatically selected, for example, when the item of content is provided to the database or when database content is viewed. Other attributes can have options that can be selected manually by the moderator, contributor, or user. For some attributes, the selection among the options can be made when the item of content is generated or when it is provided to the database. For other attributes, the selection among the options regarding that item of database content may be modified at any time or during a particular time period. The ability to select from among the options is provided to the contributors of the content to the database. By providing the contributor direct control over options associated with an item in the database the contributor can manage how another user may access and view the content. The contributor may also establish anonymity as to the source of the content, such that another user, including the moderator may not be aware of who contributed the content.

In determining attributes, the moderator can also decide and implement whether a contributor to the database can make choices regarding the attributes for items of database content (e.g., message, blog entry, comment, advertisement) provided by the contributor. Such choices can include a selection from a number of available options or a selection of whether a local rule applies to the content or not. For example, in one embodiment, an attribute implemented by the moderator relates to access to the database content and a contributor may have an option to restrict access to each individual item of content provided to the database by the contributor.

When an item of database content is provided to the database at least some of these attributes or attribute options are identified with the item. The attributes or particular attribute options may assist the operation of the database with respect to this particular item of database content. For attributes with no options, the attributes may not need to be specifically identified with the item of database content because those attributes may apply to all content items. For attributes with options, the particular selection of attribute options can be identified, if desired, with the particular item of database content on the database.

Typically associated with each item of database content is a bitmask that provides information about the item and is determined, at least in part, by one or more attributes. Bitmasks are described in more detail below in conjunction with FIG. 3. Briefly, however, the bitmask can be used to indicate which option is selected for those attributes having options. Examples of information that might be included in the bitmask are access information, display information, status information, information about the medium from which the content item was provided, and the like. The bitmask can also include other information such as, for example, the size of the content item, the date that the content item was input to the database, and the source of the content item. As such, bitmask may include virtually any information associated with available options for database information, without departing from the scope or spirit of the invention.

The bitmask can one or more individual bits or groups of bits can represent the information associated with a content item. For example, a group of bits, such as three or more bits, can be used to represent the size of the content in any unit of size (e.g., byte, kilobyte, or megabyte) selected by the service provider, database administrator, or moderator. Some items of information in the bitmask may employ a single bit where there are only one or two options. For example, if there are two options regarding access to the data, then a single bit may be used. If, however, there are more than two options then two or more bits may be used.

In some embodiments, the moderator can design the bitmask or decide, at least in part, the type of information or order of the information represented in the bitmask. In other embodiments, the database software, database administrator, or service provider may determine the form of the bitmask. However, the content of the bitmask and a definition of values for the bits in the bitmask are determined by the contributor for the related content.

Figure 3:
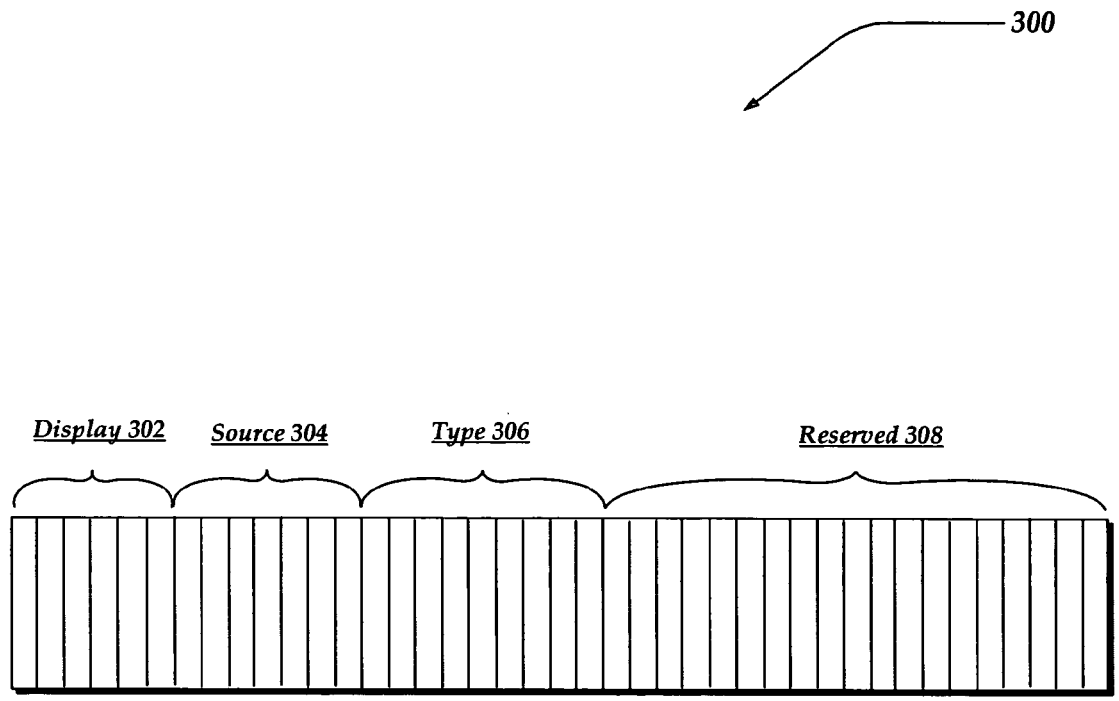
FIG. 3 illustrates one embodiment of a bitmask for use in directly controlling an attribute of a content item.

FIG. 3 illustrates one embodiment of bitmask 300 where the attributes of display, source, and type of corresponding content have been selected by the moderator for direct access/modification by a contributor of the content. Bitmask 300 may include more or less attribute components and associated bits than are shown in FIG. 3. The components and/or number of bits shown, however, are sufficient to disclose an illustrative embodiment for practicing the invention.

As shown in the figure, bitmask 300 includes display 302, source 304, type 306, and reserved 308. Each of these components includes one or more bits associated with options for an attribute of a content item.

As shown, six bits for selecting options for display attribute 302 are accessible by the moderator and/or the contributor. These display options for viewing of the content by other users could include global access, moderator access, particular group(s) access, conditional access, text only, graphic, color, and the like.

Additionally, seven bits are shown that enable a contributor and/or moderator to directly access options for source attribute 304. These source options for the "origination" of the content include anonymous, restricted (shown to a particular user or group), conditional (password protected, and the like), public, moderator, system administrator, contributor, third party source such as a news service, content provider, user group, discussion board, and the like.

As shown, nine bits for selecting options for type attribute 306 are accessible by the moderator and/or the contributor. These type options for the provided content include text, picture, clip, video, graphic, music, spoken word, animation, hyperlink, and the like. Such options may, for example, be employed to enable display, listening to, and/or viewing of the provided content.

Additionally, as shown, 19 bits included within reserved 308 are reserved for options used by the system administrator to manage the content stored in a database. These options include compression, index, priority, size, timestamp, and the like.

Figure 4:
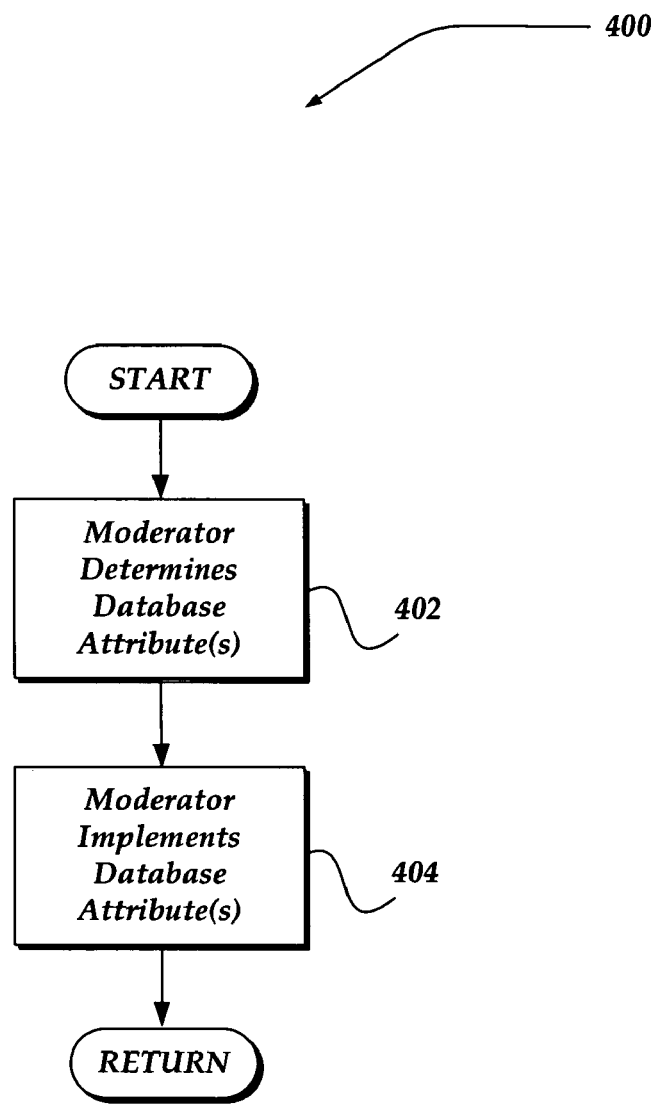
FIG. 4 is a flowchart illustrating one embodiment of a process for selecting database attributes.

FIG. 4 illustrates one process 400 for operating a database. Process 400 may be implemented, for example, within database server 114 of FIG. 1. After a start block, process 400 flows to block 402, where a moderator determines one or more database attributes. Determination of database attributes includes, for example, selecting new attributes, modifying current attributes, removing current attributes, selecting the number of options for an attribute, selecting definitions for options of the attribute, determining whether attribute options are selected automatically or manually, determining who can select from the attribute options for items of database content, determining who can modify the attributes assigned to items of database content, and the like.

Processing continues next to block 404, where the moderator implements the database attributes. The implementation may be done by the moderator without requesting changes be made by the database administrator or service provider or, optionally, without assistance or without approval from the database administrator or service provider. Upon completion of block 404, process 400 returns to a calling process to perform other actions. Although the above describes a moderator as affecting attributes, the invention is not so constrained. For example, in one embodiment, a contributor may determine and implement a database attribute, without requesting direct support from a database administrator.

Figure 5:
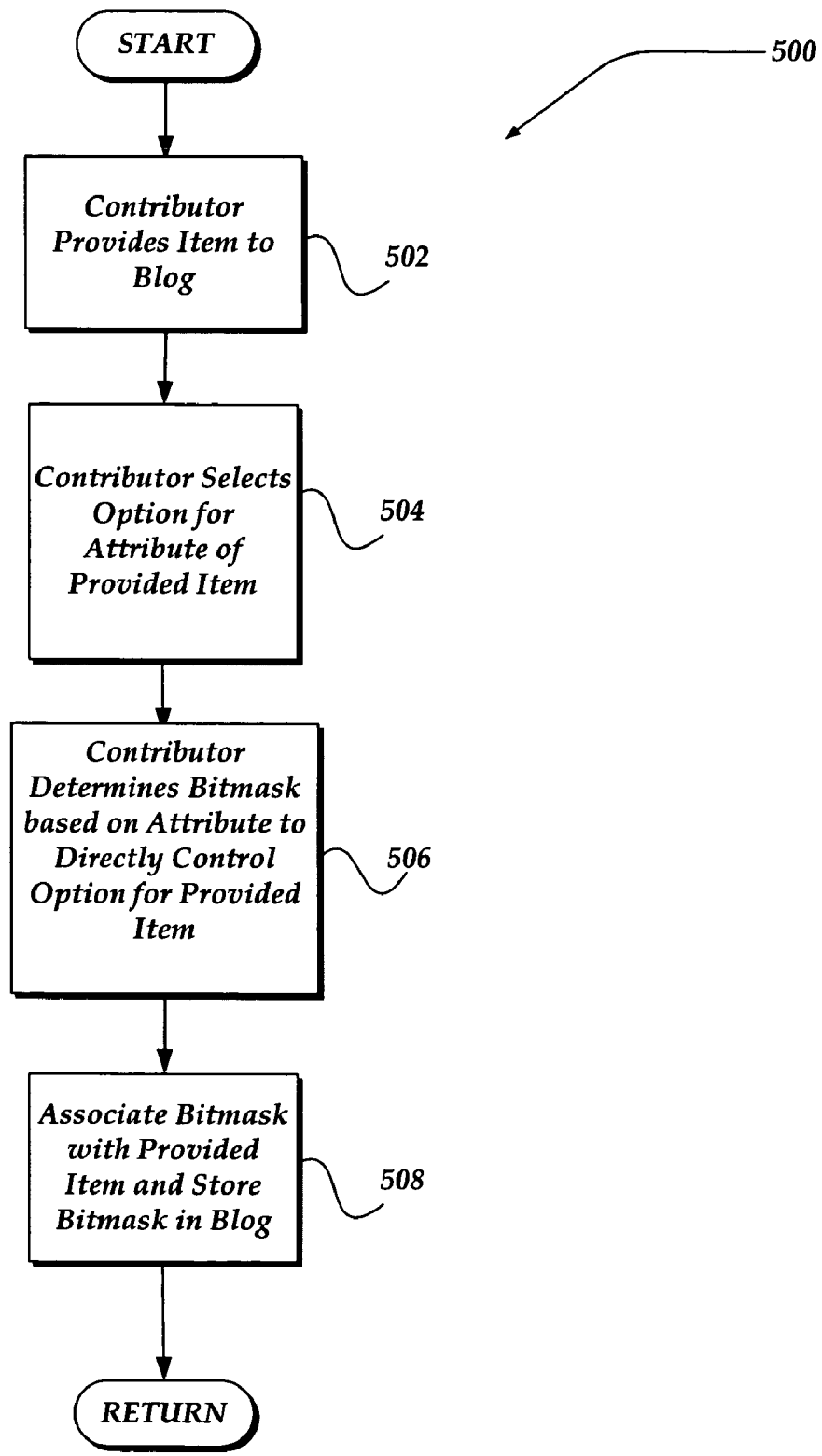
FIG. 5 is a flowchart illustrating one embodiment of a process for managing content to the database using bitmasks associated with an attribute of the contributed content, in accordance with the invention.

FIG. 5 is a flowchart illustrating one embodiment of a process for managing content to the database using a bitmask associated with an attribute of the contributed content. Process 500 may, for example, be implemented within database server 114 of FIG. 1. In one embodiment, the database is configured to manage blog content.

Process 500 begins, after a start block, at block 502, where a contributor provides a content item to the blog database. Such content items may be, for example, a posting of a message, a graphic, a document, a graphic, an audio file, and the like. Processing continues to block 504, where the contributor selects from among options for at least one or more of the attributes determined and implemented by the moderator. It may be understood that this selection of options can also occur, in part or in fill, prior to or simultaneously with providing the item to the blog database. Selection of such options enables the contributor to directly control, for example, how another user of the blog may access the content item. In one embodiment, the contributor selects an option that establishes anonymity of the contributor of the content item to others.

Processing continues to block 506, where a bitmask is determined based, at least in part, on the options of for the attributes of the content item. This can include the one or more attributes for which the contributor selected options in the previous step. In one embodiment, the contributor accesses bits associated with the selected option using an API. For example, the contributor may employ the API to set one or more bits that may establish the anonymity of the contributor, access to the content item, display of the content, and the like. The invention is not constrained to an API, however to enable the contributor to modify the bitmask, and the invention may provide virtually any mechanism to the contributor, including a window, a menu, a template, a file, and the like.

The bitmask may then be employed when another user, contributor, moderator, and the like, seeks access the content item. For example, the bitmask may be employed to determine if the other user, and the like, may access the content item, needs to provide a password to access the content item, how the content item may be displayed, and so forth. In one embodiment, the bitmask is employed to determine if the user, and the like, is enabled to determine the source of the content item, such as the contributor's identity. Such direct control of the content item by the contributor is directed towards improving the contributor's confidence in the integrity of the content item, the use and/or display of the content item, and other associated attributes of the content item.

Processing next flows to block 508, where the bitmask is then associated with the item of database content. Also at block 508, the bitmask may be stored in the blog database, such that it may be located when another user attempts to access the content item. Processing then returns to a calling process to perform other actions.

It may be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It may also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A computer-implemented method of managing content for a blog database, the method comprising:
   receiving a content item from a contributor, the content item being displayable on a blog website;
   receiving from the contributor a selection to control at least one attribute of the content item that controls at least one of an access to or display of the content item;
   setting one or more bits within a bitmask that correspond to the selection received from the contributor;
   associating the bitmask with the content item in the blog database;
   receiving a request to access the content item from a requestor that is other than the contributor of the content item;
   examining the bitmask to determine the selected access or display control attributes for the requested content item; and
   using the results of the bitmask examination to selectively display portions of the requested content item.

2. The method of claim 1, wherein the selection from the contributor of the content item, further controls at least one of a display of the content item to, anonymity of the contributor to, and an access of the content item by, another user of the blog database.

3. The method of claim 1, wherein receiving from the contributor the selection further comprises receiving the selection from a client device associated with the contributor.

4. The method of claim 1, wherein receiving from the contributor further comprises employing, by the contributor, at least one of an API, a template, a file, a window, a command line interface, and a menu interface.

5. The method of claim 1, wherein the at least one attribute is managed, at least in part, by a moderator of the blog database.

6. The method of claim 1, wherein associating the bitmask with the content item further comprises inserting the bitmask into a header of a data packet.

7. The method of claim 1, wherein setting one or more bits within the bitmask further comprises determining at least one of a plurality of bits, each bit being associated with a directly controllable option of the attribute for the content item.

8. The method of claim 1, wherein the bitmask includes bits that are selectable by the contributor of the content item to directly control an access to the content item based in part on at least one of a group in which the requestor is associated, or a password provided by the requestor.

9. The method of claim 1, wherein setting one or more bits within the bitmask further comprises generating a portion of the bitmask corresponding to another option directly controllable by the contributor.

10. The method of claim 1, wherein the selection of the at least one attribute further comprises selecting an access attribute that is directly controlled by the contributor through at least one bit in the bitmask.

11. The method of claim 1, wherein the at least one attribute comprises a display attribute that is useable to determine how to display the content item that is directly controller by the contributor through at least one bit in the bitmask.

12. The method of claim 1, wherein the at least one attribute further comprises an attribute that indicates anonymity of the contributor of the content item and is directly controllable by the contributor through the bitmask.

13. The method of claim 1, wherein the method is accessible through a mobile device.

14. A server for managing content for use on a blog website, comprising:
   a memory for storing data; and
   a processor that employs the stored data to perform actions, comprising:
      receiving a content item from a contributor for storage in the database;
      receiving from the contributor a selection to directly control an attribute associated with the content item;
      based on the selection from the contributor, selectively setting one or more bits within a bitmask for the content item in the database, the one or more bits directly controlling the selected attribute of the content item;
      associating the bitmask with the content item in the blog database; and
      providing the bitmask to the blog database, wherein the bitmask is examined in response to a request for the content item to determine a selective display of the requested content item on the blog website.

15. The server of claim 14, wherein the processor performs actions, further comprising:
   providing at least one of an API, a bitmask template, and a file to the contributor for use in modifying the bitmask.

16. The server of claim 14, wherein the bitmask includes at least one bit associated with the attribute of the content item, wherein the attribute includes at least one of a source, a display, and a content type.

17. A computer-readable storage medium storing instructions that when implemented within a computer device causes a computer program to execute a computer process for managing content associated with a blog, the instructions comprising:
   receiving a content item from a contributor for storage in the blog;
   receiving from the contributor a selection to directly control an attribute associated with the content item;
   selectively setting one or more bits within a bitmask for the content item in the blog based on the selection received from the contributor, wherein the bitmask enables the contributor to directly control the attribute associated with the content item;

associating the bitmask with the content item; and providing the bitmask to the blog such that the bitmask is examined in response to a request for access to the content item to selectively display the requested content item on the blog.

18. The computer-readable storage medium of claim 17, wherein the instructions are communicated over a network between a mobile client device and a server.

19. The computer-readable storage medium of claim 17, wherein setting one or more bits within the bitmask further comprises determining at least one of a plurality of bits, each bit being associated with a directly controllable option of the attribute for the content item.

20. A client device that is configured to manage a database over a network for use in a blog website, comprising:

a transceiver for receiving and sending information over the network; and an application that is configured to perform actions, including:

providing a content item to the database;

receiving from a contributor of the content, through the client device, a selection that enables the contributor to directly control an attribute for the provided content item;

selectively setting one or more bits within a bitmask that correspond to the received selection associating the bitmask with the content item in the database; and providing the bitmask to the database such that the bitmask is examined in response to a request to access the content item to determine a selective display of the requested content item at the blog website.

21. The client device of claim 20, wherein the bitmask includes bits that are selectable by the contributor of the content item to directly control at least one of an access by another user of the database, a display of the content item to another user, and anonymity of the contributor.

22. The client device of claim 20, wherein the attribute further comprises options that control at least one of a display of information about the contributor, or a requirement that access to the content item depends upon a password, or a membership of a group.

23. The client device of claim 20, wherein the attribute further comprises a status attribute.

24. The client device of claim 20, wherein the client device is further configured to operate as a mobile device.

25. A server for managing content for a blog site, comprising:

a memory element comprising a blog database, wherein the blog database has an attribute associated with content in the blog database, the blog database being further configured to store a bitmask associated with the attribute, the bitmask being arranged to enable a contributor of the content to directly control an option of the attribute for the contributed content; and a processor that is configured to perform actions, including:

in response to a request to display the content, examining the bitmask to determine a selective display of the requested content based, in part, on the option of the attributed controlled by the contributor; and selectively displaying the requested content on the blog site based on the examination and determination.

26. The server of claim 25, wherein the option enables the contributor to directly control a display of the content based on at least one of text, graphic, or color associated with the content.

27. The server of claim 25, wherein the bitmask is accessible to the contributor through at least one of an API, a template, and a file.

28. The server of claim 25, wherein the option enables the contributor to directly control if another user of the blog database is able to access the contributed content based at least one of a particular group access, or a password.

29. The server of claim 25, wherein the option further enables the contributor to directly control anonymity of a source of the content.

* * * * *

UNITED STATES PATENT AND TRADEMARK OFFICE
CERTIFICATE OF CORRECTION

PATENT NO. : 7,689,575 B2 Page 1 of 1
APPLICATION NO. : 11/027208
DATED : March 30, 2010
INVENTOR(S) : Vijay Sundar Ramachandran et al.

It is certified that error appears in the above-identified patent and that said Letters Patent is hereby corrected as shown below:

In the Claims:
In column 14, line 18, in claim 11, delete "controller" and insert -- controlled --, therefor.

Signed and Sealed this

Twelfth Day of October, 2010

David J. Kappos
*Director of the United States Patent and Trademark Office*